United States Patent
Li et al.

(10) Patent No.: US 10,997,387 B2
(45) Date of Patent: May 4, 2021

(54) FINGERPRINT RECOGNITION CIRCUIT AND METHOD FOR DRIVING THE SAME, DISPLAY PANEL

(71) Applicant: BOE TECHNOLOGY GROUP CO., LTD., Beijing (CN)

(72) Inventors: Changfeng Li, Beijing (CN); Haisheng Wang, Beijing (CN); Yingming Liu, Beijing (CN); Xiaoliang Ding, Beijing (CN); Rui Xu, Beijing (CN); Pengpeng Wang, Beijing (CN); Wei Liu, Beijing (CN); Pinchao Gu, Beijing (CN); Yunke Qin, Beijing (CN); Yuzhen Guo, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 288 days.

(21) Appl. No.: 16/089,763

(22) PCT Filed: Feb. 24, 2018

(86) PCT No.: PCT/CN2018/077120
§ 371 (c)(1),
(2) Date: Sep. 28, 2018

(87) PCT Pub. No.: WO2018/218999
PCT Pub. Date: Dec. 6, 2018

(65) Prior Publication Data
US 2020/0356743 A1    Nov. 12, 2020

(30) Foreign Application Priority Data

Jun. 1, 2017 (CN) .................. 201710406161.4

(51) Int. Cl.
*G06K 9/00* (2006.01)
(52) U.S. Cl.
CPC .................. *G06K 9/0002* (2013.01)
(58) Field of Classification Search
None
See application file for complete search history.

(56) References Cited

U.S. PATENT DOCUMENTS

| 2015/0243720 A1* | 8/2015 | Kwon ............. H01L 27/1222 257/40 |
| 2017/0115811 A1* | 4/2017 | Yang ................ G06F 3/042 |

(Continued)

*Primary Examiner* — Joseph R Haley
(74) *Attorney, Agent, or Firm* — Nath, Goldberg & Meyer; Joshua B. Goldberg

(57) ABSTRACT

Provided is a fingerprint recognition circuit, including a resetting sub-circuit, a fingerprint sensing sub-circuit, a signal acquiring sub-circuit, and a driving sub-circuit, the resetting sub-circuit is connected to the reading node, the resetting port, a first port for resetting the reading node; the fingerprint sensing sub-circuit is connected to the reading node for acquiring fingerprint information, converting it into a detection signal to output to the reading node; the signal acquiring sub-circuit is connected to the reading node, the driving sub-circuit and a power port to output a signal of the reading node to the driving sub-circuit; the driving sub-circuit is connected to a reading port, the signal acquiring sub-circuit, an output port and a second port, outputs the signal output by the signal acquiring sub-circuit through the reading port in a fingerprint recognition stage, outputs the signal of the reading port to the output port in a display stage.

16 Claims, 3 Drawing Sheets

(56) References Cited

U.S. PATENT DOCUMENTS

2017/0205941 A1* 7/2017 Liu ..................... G06F 3/0412
2018/0046836 A1* 2/2018 Hinger ................ G06K 9/0002

* cited by examiner

FINGERPRINT RECOGNITION CIRCUIT AND METHOD FOR DRIVING THE SAME, DISPLAY PANEL

CROSS-REFERENCE TO RELATED APPLICATIONS

This is a National Phase Application filed under 35 U.S.C. 371 as a national stage of PCT/CN2018/077120, filed Feb. 24, 2018, an application claiming the benefit of application No. 201710406161.4, entitled "Fingerprint recognition Sub-Circuit and Method for driving the same, Display Panel", filed on Jun. 1, 2017, the content of each of which is hereby incorporated by reference in its entirety.

TECHNOLOGY

The present disclosure relates to the field of display technology, and in particular, to a fingerprint recognition circuit and a method for driving the same, and a display panel.

BACKGROUND

Fingerprint is a characteristic that is inherent in the human body, is unique and distinguishable from others. Fingerprint consists of a series of ridges and valleys on a surface of skin of a finger tip. The details of the ridge and the valley usually include branches of the ridge, ends, arches, tent-shaped arches, left loop, right loop, whorl or double loop whorl of the ridge, etc., which determine the uniqueness of each fingerprint. Fingerprint recognition technology developed based on fingerprint is an early technology for personal authentication. According to different methods of fingerprint collection and input, the fingerprint recognition technologies, which are widely used and well-known, include: an optical imaging method, a thermal sensor method, a human body infrared sensor method, etc.

SUMMARY

An embodiment of the present disclosure provides a fingerprint recognition circuit capable of recognizing fingerprint information of a human body, including a resetting sub-circuit, a fingerprint sensing sub-circuit, a signal acquiring sub-circuit and a driving sub-circuit, the resetting sub-circuit being respectively connected to a reading node, a resetting port and a first port, and configured to reset a potential of the reading node; the fingerprint sensing sub-circuit being connected to the reading node for acquiring fingerprint information by using ultrasonic and converting the fingerprint information into a detection signal to output to the reading node; the signal acquiring sub-circuit being respectively connected to the reading node, the driving sub-circuit and a power port, and configured to output a signal of the reading node to the driving sub-circuit; the driving sub-circuit being respectively connected to a reading port, the signal acquiring sub-circuit, an output port and a second port, and configured to output the signal output by the signal acquiring sub-circuit through the reading port during a fingerprint recognition stage, and output the signal of the reading port to the output port during a display stage.

In an implementation, the driving sub-circuit includes a first transistor, a first electrode of the first transistor is connected to the reading port, a second electrode of the first transistor is connected to the signal acquiring sub-circuit and the output port, and a control electrode of the first transistor is connected to the second port.

In an implementation, the first transistor is an oxide thin film transistor.

In an implementation, the signal acquiring sub-circuit includes a second transistor, a first electrode of the second transistor is connected to the driving sub-circuit, a second electrode of the second transistor is connected to the power port, and a control electrode of the second transistor is connected to the reading node.

In an implementation, the second transistor is a low temperature polysilicon thin film transistor.

In an implementation, the resetting sub-circuit includes a third transistor, a first electrode of the third transistor is connected to the resetting port, a second electrode of the third transistor is connected to the reading node, and a control electrode of the third transistor is connected to the first port.

In an implementation, the third transistor is an oxide thin film transistor.

In an implementation, the fingerprint sensing sub-circuit includes a transmitting structure and a receiving structure, the transmitting structure is configured to generate an ultrasonic signal; the receiving structure is configured to receive an ultrasonic signal reflected by a finger, and convert the ultrasonic signal into a detection signal to output to the reading node.

An embodiment of the present disclosure provides a method for driving a fingerprint recognition circuit, including a fingerprint recognition stage and a display stage. The fingerprint recognition stage includes: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information by using ultrasonic and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port. The display stage includes: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

An embodiment of the present disclosure provides a display panel, including any of the above fingerprint recognition circuits, a plurality of gate lines, a plurality of resetting lines, a plurality of power lines, a plurality of reading lines and a plurality of display circuits, each fingerprint recognition circuit is configured as following: the output port of the fingerprint recognition circuit being connected to a display circuit; the first port and the second port of the fingerprint recognition circuit being respectively connected to adjacent two gate lines; the resetting port of the fingerprint recognition circuit being connected to a resetting line; the power port of the fingerprint recognition circuit being connected to a power line; the reading port of the fingerprint recognition circuit being connected to a reading line, which is multiplexed as a data line during a display stage.

Reference Signs: T1, first transistor; T2, second transistor; T3, third transistor; Rx, receiving structure; Tx, transmitting structure; PN, rectifier diode; Gate, gate line; Reset, resetting line; SD&RD, reading line; Vd, power line; Pixel, pixel electrode; 101, resetting sub-circuit; 102, fingerprint sensing sub-circuit; 103, signal acquiring sub-circuit; 104, driving sub-circuit; P1, first port; P2, second port; RP, reading port; N1, reading node; R, resetting port; OUTPUT, output port.

EMBODIMENTS

The present disclosure will be further described in detail below in conjunction with the accompanying drawings and specific embodiments.

Figure 1:
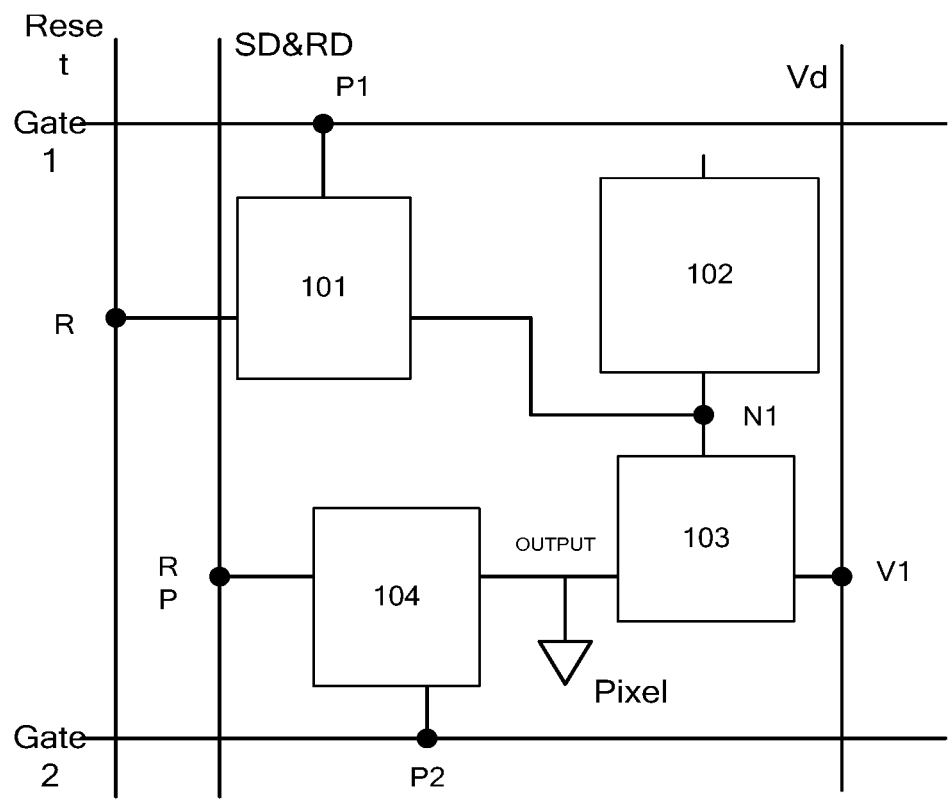
FIG. 1 is a structural diagram of a fingerprint recognition circuit according to an embodiment of the present disclosure.

As shown in FIGS. 1 through 4, an embodiment of the present disclosure provides a fingerprint recognition circuit capable of recognizing human fingerprint information. As shown in FIG. 1, the fingerprint recognition circuit includes a resetting sub-circuit 101, a fingerprint sensing sub-circuit 102, a signal acquiring sub-circuit 103, and a driving sub-circuit 104.

The resetting sub-circuit 101 is connected to a reading node N1, a resetting port R, and a first port P1, respectively, for resetting a potential of the reading node. The fingerprint sensing sub-circuit 102 is connected to the reading node N1 for acquiring fingerprint information and converting the fingerprint information into a detection signal to output to the reading node N1. The signal acquiring sub-circuit 103 is connected to the reading node N1, the driving sub-circuit 104 and a power port V1, respectively, for outputting a signal of the reading node N1 to the driving sub-circuit 104. The driving sub-circuit 104 is connected to a reading port RP, the signal acquiring sub-circuit 103, an output port OUTPUT and a second port P2, respectively, for outputting a signal output by the signal acquiring sub-circuit 103 through the reading port RP during a fingerprint recognition stage, and outputting a signal of the reading port RP to the output port OUTPUT during a display stage.

The reading node N1 is a connection point of the resetting sub-circuit 101, the fingerprint sensing sub-circuit 102, and the signal acquiring sub-circuit 103.

In this embodiment, the resetting sub-circuit 101 resets the potential of the reading node N1, and then the potential of the reading node N1 changes correspondingly according to the detection signal output by the fingerprint sensing sub-circuit 102, thereby causing the signal output from the signal acquiring sub-circuit 103 to change accordingly, which in turn causes the signal output from the driving sub-circuit 104 to the reading port RP to change. Since the fingerprint sensing sub-circuit 102 in the embodiment can convert the fingerprint information into the detection signal to output, after the fingerprint sensing sub-circuit 102 senses different fingerprint information, signals output by the driving sub-circuit to the reading port RP are different, therefore, the fingerprint information can be recognized based on the signals of the reading port RP, That is to say, in this embodiment, a pixel circuit capable of recognizing fingerprint information is provided.

Figure 3:
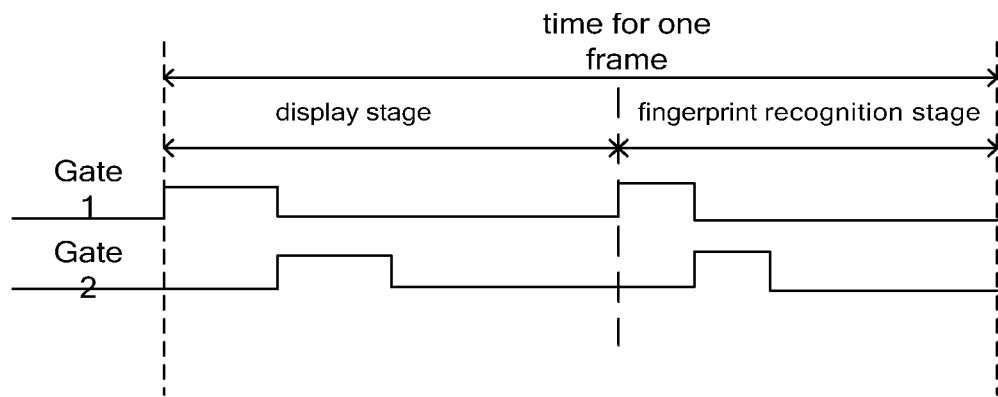
FIG. 3 is a timing chart for a fingerprint recognition circuit according to an embodiment of the present disclosure.

The fingerprint recognition circuit provided in this embodiment can realize display and fingerprint recognition respectively in different stages in one frame, and a timing chart of fingerprint recognition in the display state is as shown in FIG. 3. It can be understood that in a case where the fingerprint recognition circuit only provides the display function but does not provide the fingerprint recognition function, the fingerprint recognition stage in one frame is in an off state.

Figure 2:
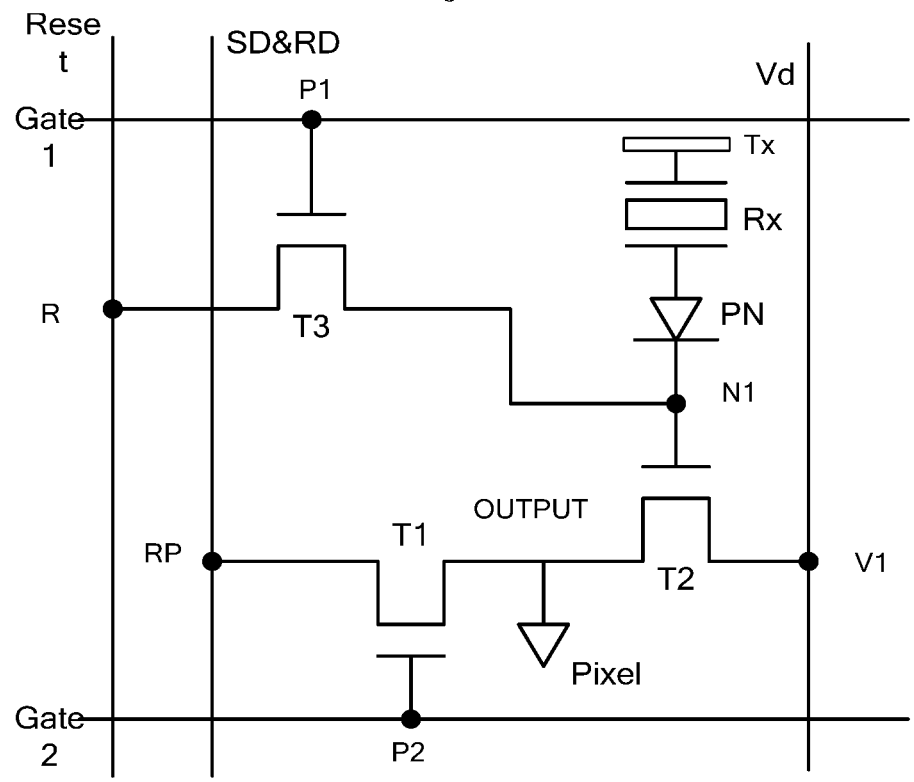
FIG. 2 is a structural diagram illustrating details of a fingerprint recognition circuit according to an embodiment of the present disclosure.

In the fingerprint recognition circuit, as shown in FIG. 2, the driving sub-circuit includes a first transistor T1, a first electrode of the first transistor T1 is connected to the reading port RP, and the reading port RP is connected to a reading line SD&RD, a second electrode of the first transistor T1 is connected to the signal acquiring sub-circuit and the output port OUTPUT, a control electrode of the first transistor T1 is connected to a second port P2, and the second port P2 is connected to a gate line Gate 2. A working principle of the driving sub-circuit is: during the fingerprint recognition stage, a working level is input to the second port P2 through the gate line Gate 2, so that the first transistor T1 is turned on, and a signal output by the signal acquiring sub-circuit 103 is output to the reading port RP through the first electrode of the first transistor; and during the display stage, a working level is input to the second port P2 through the gate line Gate 2, so that the first transistor T1 is turned on, and a display signal is input to the reading port RP through the reading line SD&RD, and the display signal is output from the output port OUTPUT through the first transistor T1.

It can be understood that the reading port RP can also be connected to other circuits (such as an image processing circuit) through the reading line SD&RD for performing fingerprint recognition in subsequent processes.

In an embodiment, the first transistor T1 is an oxide thin film transistor (Oxide TFT). Since the oxide thin film transistor has better uniformity and low leakage current (the leakage current of a general oxide thin film transistor is lower than $10^{-13}$ ampere), a static black image can be better maintained during the display stage to improve the display quality, at the same time, it can reduce the driving frequency, reduce power consumption and enhance electricity storage capacity.

In an embodiment, the output port OUTPUT is connected to a display circuit (pixel electrode). During the display stage, the driving sub-circuit charges the pixel electrode.

In an embodiment, the signal acquiring sub-circuit includes a second transistor T2, a first electrode of the second transistor T2 is connected to the driving sub-circuit 104, a second electrode of the second transistor T2 is connected to the power port V1, the power port V1 is connected to a power line Vd, and a control electrode of the second transistor T2 is connected to the reading node N1. A working principle of the signal acquiring sub-circuit 103 is: during the fingerprint recognition stage, since different potentials of the reading node N1 may cause characteristics of the second transistor T2 to be in different states, when the power port V1 is at a fixed potential, the first electrode of the second transistor T2 can output different currents under the control of different potentials at the reading node N1.

Figure 4:
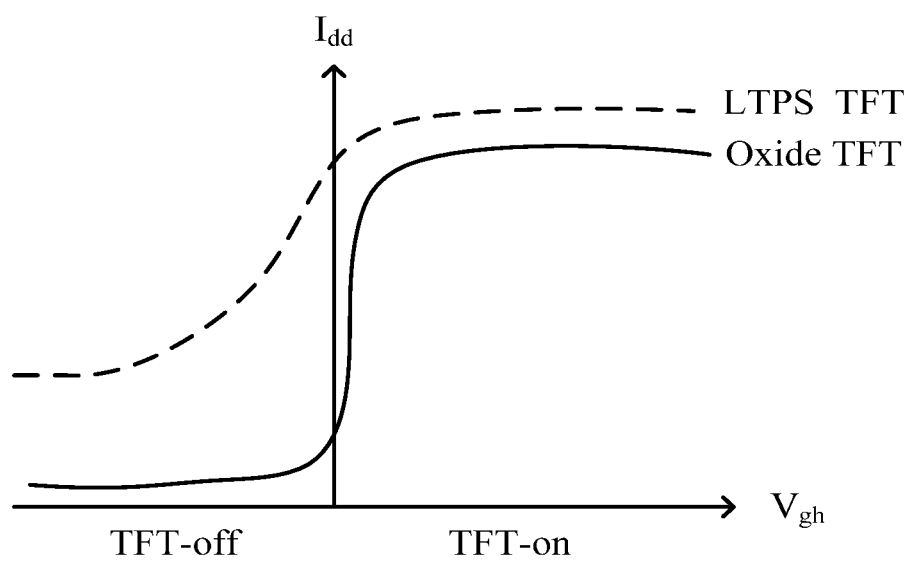
FIG. 4 is a chart illustrating characteristic curves of a low temperature polysilicon thin film transistor and an oxide thin film transistor used in an embodiment of the present disclosure.

In an embodiment, the second transistor T2 is a low temperature polysilicon thin film transistor (LTPS TFT). As shown in FIG. 4, the linear region of the low-temperature polysilicon thin film transistor has a gentle slope. Compared with the oxide thin film transistor (Oxide TFT) having a large slope in the linear region, the low-temperature polysilicon thin film transistor can output different currents Idd more accurately under different turn-on voltages Vgh. Therefore, by judging the output current of the low-temperature polysilicon thin film transistor, it can be easy to distinguish the corresponding turn-on voltage (the potential of the reading node), thereby the fingerprint recognition is more accurate.

In an embodiment, the resetting sub-circuit 101 includes a third transistor. T3, a first electrode of the third transistor T3 is connected to a resetting port R, the resetting port R is connected to the resetting line Reset, a second electrode of the third transistor T3 is connected to the reading node N1, and a control electrode of the third transistor T3 is connected to the first Port P1, the first port P1 is connected to a gate line Gate 1. A working principle of the resetting sub-circuit is: during the fingerprint recognition stage, a working level is input to the first port P1 through the gate line Gate 1, so that the third transistor T3 is turned on, and a resetting level (i.e., a predetermined level) is input to the resetting port R through the resetting line Reset to reset the potential of the reading node N1; during the display stage, a working level is input to the first port P1 through the gate line Gate 1, so that the third transistor T3 is turned on, and a turn-off level is input to the resetting port R through the resetting line Reset, so that the signal acquiring sub-circuit 103 is turned off to prevent the signal acquiring sub-circuit 103 from affecting the driving sub-circuit 104.

It can be understood that the gate lines Gate 2 and. Gate 1 connected to the control electrodes of the first transistor T1 and the third transistor T3 are two different gate lines Gate.

In an embodiment, the third transistor T3 is an oxide thin film transistor. The oxide thin film transistor has a low leakage current (the leakage current of the oxide thin film transistor is generally lower than $10^{-13}$ ampere), which can minimize charge loss of the reading node N1, thereby fully maintaining the potential of the reading node N1, thus switching state of the second transistor T2 can be precisely controlled.

In an embodiment, the fingerprint sensing sub-circuit 102 includes a transmitting structure Tx and a receiving structure Rx. The transmitting structure is configured to generate an ultrasonic signal; the receiving structure Rx is configured to receive ultrasonic signal reflected by a finger, and convert the ultrasonic signal into a detection signal to output to the reading node N1.

Since multitudes of the ultrasonic signals reflected by the valleys and ridges of the fingerprint are different, magnitudes of the detection signal into which the ultrasonic signals corresponding to the valleys and ridges are converted by the receiving structure Rx are also different, so that signals at the reading node N1 are also different.

In an embodiment, the fingerprint sensing sub-circuit 102 further includes a rectifier diode PN, a first electrode of the rectifier diode PN is connected to the receiving structure Rx, and a second electrode of the rectifier diode PN is connected to the reading node N1. Since the rectifier diode PN has unidirectional conductivity, that is, the rectifier diode PN functions as a filter, at this time, an electrical signal output from the receiving structure Rx can be rectified to prevent the current from being reversed.

It should be noted that, in this embodiment, the term "control electrode" specifically refers to a gate of a transistor, and the term "first electrode" specifically refers to one of a source and a drain of a transistor, and the term "second electrode" specifically refers to the other one of a source and a drain of a transistor. Certainly, it should be understood by those skilled in the art that the "first electrode" and the "second electrode" can be interchanged.

The present embodiment provides a fingerprint recognition circuit including a resetting sub-circuit, a fingerprint sensing sub-circuit, a signal acquiring sub-circuit, and a driving sub-circuit. The resetting sub-circuit resets the potential of the reading node, and then the potential of the reading node changes correspondingly according to the detection signal output by the fingerprint sensing sub-circuit, so that the signal output by the signal acquiring sub-circuit changes correspondingly, thereby the signal output from the driving sub-circuit to the reading port changes. Since the fingerprint sensing sub-circuit in the present disclosure can convert the fingerprint information into the detection signal to output, after the fingerprint sensing sub-circuit senses different fingerprint information, the signals output from the driving sub-circuit to the reading port are also different, therefore, the fingerprint information can be recognized according to the signals of the reading port. In this embodiment, the leakage current of the third transistor T3 is small, the potential of the reading node can be well maintained, and the linear region of the second transistor T2 has gentle slope, which can realize accurate fingerprint recognition, and can well maintain a static black screen during the display stage, therefore the display quality can be improved.

The present embodiment further provides a method for driving the fingerprint recognition circuit, which includes a fingerprint recognition stage and a display stage.

The fingerprint recognition stage includes: at a first resetting sub-stage, a working level is input to the first port P1, a turn-off level is input to the second port P2, a resetting level is input to the resetting port R, and the resetting sub-circuit 101 resets a potential of the reading node N1; and at a reading sub-stage, a turn-off level is input to the first port P1, a working level is input to the second port P2, the fingerprint sensing sub-circuit 102 acquires fingerprint information by using ultrasonic and converts the fingerprint information into a detection signal to output to the reading node N1, the signal acquiring sub-circuit 103 outputs a signal of the reading node N1 to the driving sub-circuit 104, and the driving sub-circuit 104 outputs the signal output by the signal acquiring sub-circuit 103 through the reading port OUTPUT.

The display stage includes: at a second resetting sub-stage, a working level is input to the first port P1, a turn-off level is input to the second port P2, and a turn-off level is input to the resetting port R; and at a charging sub-stage, a turn-off level is input to the first port P1, a working level is input to the second port P2, a display signal is input to the reading port RP, and the driving sub-circuit 104 outputs the display signal of the reading port RP to the output port OUTPUT.

Specifically, specific working processes of the fingerprint recognition circuit during the fingerprint recognition stage and the display stage will be described below by taking the resetting sub-circuit 101 including the third transistor T3, the fingerprint sensing sub-circuit 102 including the transmitting structure Tx and the receiving structure Rx, the signal acquiring sub-circuit 103 including the second transistor T2, and the driving sub-circuit 104 including the first transistor T1 as an example.

The working level refers to a level at which the transistor can be turned on, and the turn-off level is a level at which the transistor can be turned off. For an N-type transistor, the working level is a high level and the turn-off level is a low level. For a P-type transistor, the working level is a low level and the turn-off level is a high level.

It can be understood that the potential of the power port V1 remains fixed while the fingerprint recognition circuit is operating.

More specifically, the fingerprint recognition stage specifically includes: at a first resetting sub-stage, a working level is input to the first port P1, and a turn-off level is input to the second port P2, so that the third transistor T3 is turned on, the first transistor T1 is turned off, and a resetting level (i.e., a predetermined level) is input to the resetting port R, the resetting level is transmitted to the reading node N1 through the first transistor T1 to reset the potential of the reading node N1 (potential initialization); at the reading sub-stage, the transmitting structure Tx generates an ultrasonic wave, the receiving structure Rx receives the ultrasonic signal reflected by the finger, and converts the ultrasonic signal into a detection signal to output to the reading node N1, thereby controlling the second transistor T2 to output a corresponding signal, an turn-off level is input to the first port P1, a working level is input to the second port P2, so that the third transistor T3 is turned off, the first transistor T1 is turned on, so that the signal output by the second transistor T2 is output to the reading port RP through the first electrode of the first transistor. T1, by analyzing the signal, it can be determined whether the location where the fingerprint recognition circuit is corresponds to a valley or a ridge of the fingerprint, and if there is no fingerprint recognition operation, the reading node N1 maintains the resetting level, and the signal output from the reading port RP remains unchanged; at a first holding sub-stage, a turn-off level is input to the first port P1 and the second port P2, at this time, the fingerprint recognition circuit does not perform fingerprint recognition, and waits for fingerprint recognition circuits of other rows to perform fingerprint recognition.

More specifically, the display stage specifically includes: at the second resetting sub-stage, a working level is input to the first port P1, and a turn-off level is input to the second port P2, so that the third transistor T3 is turned on and the first transistor T1 is turned off, at the same time, a turned-off level is input to the resetting port R, so that the second transistor T2 is turned off to prevent the signal of the power port from affecting the display circuit; at the charging sub-stage, a turn-off level is input to the first port P1, inputting a working level to the second port P2, so that the third transistor T3 is turned off and the first transistor T1 is turned on, at the same time, a display signal is input to the reading port R, the display signal is output to the output port OUTPUT through the first transistor T1, and the output port OUTPUT is connected to the display circuit (pixel electrode), and the display circuit displays according to the display signal; at a second holding sub-stage, a turn-off level is input to the first port P1 and the second port P2, at this time, the fingerprint recognition circuit is no longer operating, and the display circuit (pixel electrode) connected thereto keeps displaying the current content by means of a storage capacitor, and waits for other rows of display circuits to display.

Figure 5:
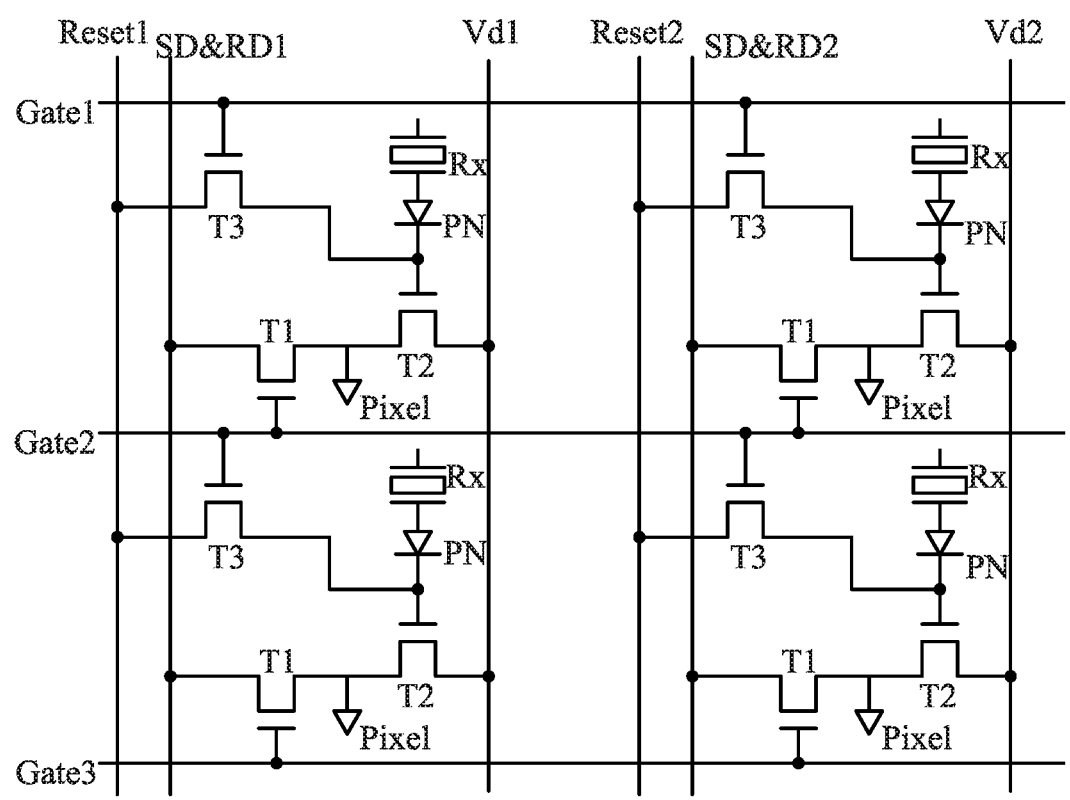
FIG. 5 is a structural diagram of a display panel according to an embodiment of the present disclosure.

As shown in FIG. 5, the present disclosure further provides a display panel having a fingerprint recognition function, including display circuits, a plurality of the abovementioned fingerprint recognition circuits, a plurality of gate lines Gate, a plurality of resetting lines Reset, a plurality of power lines Vd and a plurality of reading lines SD&RD.

For each fingerprint recognition circuit, the output port OUTPUT thereof is connected to the display circuit; the first port P1 and the second port P2 thereof are respectively connected to two adjacent gate lines Gate 1 and Gate 2; the resetting port R thereof is connected to the resetting line Reset; the power port V1 thereof is connected to the power line Vd; the reading port RP thereof is connected to the reading line SD&RD, and the reading line SD&RD thereof is multiplexed as the data line during the display stage.

The reading line SD&RD multiplexing means that the reading line SD&RD is used to read the detection signal from the reading port RP during the fingerprint recognition stage, and is used to input the display signal to the reading port RP during the display stage to control the display of the display circuit through the first transistor T1.

In an embodiment, first ports P1 of fingerprint recognition circuits disposed in a same row are connected to a same gate line Gate, and second ports P2 of the fingerprint recognition circuits disposed in a same row are connected to a same gate line Gate. Resetting ports RP of fingerprint recognition circuits disposed in a same column are connected to a same resetting line Reset, reading ports RP of fingerprint recognition circuits disposed in a same column are connected to a same reading line SD&RD, and power ports V1 of fingerprint recognition circuits disposed in a same column are connected to a same power line Vd.

The control electrodes of the first transistors T1 of the $N^{th}$ row and the third transistors T3 of the $(N+1)^{th}$ row are connected to a same gate line Gate to simplify the fabrication process. Further, when the fingerprint recognition circuits of the $N^{th}$ row are in the display stage, the gate line Gate (the gate line Gate connected to the first transistors T1 of the $N^{th}$ row and the third transistors T3 of the $(N+1)^{th}$ row) is input with a working level, the fingerprint recognition circuits of the $(N+1)^{th}$ row are in the fingerprint recognition stage.

The specific working principle of the display panel refers to the previous description, and details thereof are not described herein.

It should be understood that, the foregoing embodiments are only exemplary embodiments used for explaining the principle of the present disclosure, but the present disclosure is not limited thereto. Various variations and modifications may be made by a person skilled in the art without departing from the spirit and essence of the present invention, and these variations and modifications also fall into the protection scope of the present disclosure.

The invention claimed is:

1. A fingerprint recognition circuit comprising a resetting sub-circuit, a fingerprint sensing sub-circuit, a signal acquiring sub-circuit and a driving sub-circuit, wherein
the resetting sub-circuit being respectively connected to a reading node, a resetting port and a first port, and configured to reset a potential of the reading node;
the fingerprint sensing sub-circuit being connected to the reading node for acquiring fingerprint information and converting the fingerprint information into a detection signal to output to the reading node;
the signal acquiring sub-circuit being respectively connected to the reading node, the driving sub-circuit and a power port, and configured to output a signal of the reading node to the driving sub-circuit;

the driving sub-circuit being respectively connected to a reading port, the signal acquiring sub-circuit, an output port and a second port, and configured to output the signal output by the signal acquiring sub-circuit through the reading port during a fingerprint recognition stage, and output the signal of the reading port to the output port during a display stage, wherein the first port and the second port are coupled to different gate lines; and the driving sub-circuit consists of a first transistor, a first electrode of the first transistor is connected to the reading port, a second electrode of the first transistor is connected to the signal acquiring sub-circuit and the output port, and a control electrode of the first transistor is connected to the second port.

2. The fingerprint recognition circuit according to claim 1, wherein the first transistor is an oxide thin film transistor.

3. The fingerprint recognition circuit according to claim 1, wherein the signal acquiring sub-circuit includes a second transistor, a first electrode of the second transistor is connected to the driving sub-circuit, a second electrode of the second transistor is connected to the power port, and a control electrode of the second transistor is connected to the reading node.

4. The fingerprint recognition circuit according to claim 3, wherein the second transistor is a low temperature polysilicon thin film transistor.

5. The fingerprint recognition circuit according to claim 1, wherein the resetting sub-circuit comprises a third transistor, a first electrode of the third transistor is connected to the resetting port, a second electrode of the third transistor is connected to the reading node, and a control electrode of the third transistor is connected to the first port.

6. The fingerprint recognition circuit according to claim 5, wherein the third transistor is an oxide thin film transistor.

7. The fingerprint recognition circuit according to claim 1, wherein the fingerprint sensing sub-circuit comprises a transmitting structure and a receiving structure, the transmitting structure is configured to generate an ultrasonic signal;

the receiving structure is configured to receive an ultrasonic signal reflected by a finger, and convert the ultrasonic signal into a detection signal to output to the reading node.

8. A method for driving a fingerprint recognition circuit according to claim 1, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

9. A method for driving a fingerprint recognition circuit according to claim 2, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

10. A method for driving a fingerprint recognition circuit according to claim 3, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

11. A method for driving a fingerprint recognition circuit according to claim 4, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

12. A method for driving a fingerprint recognition circuit according to claim 5, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

13. A method for driving a fingerprint recognition circuit according to claim 6, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

14. A method for driving a fingerprint recognition circuit according to claim 7, comprising a fingerprint recognition stage and a display stage, wherein the fingerprint recognition stage comprises: at a first resetting sub-stage, inputting a working level to the first port, inputting a turn-off level to the second port, inputting a resetting level to the resetting port, and resetting, by the resetting sub-circuit, a potential of the reading node; and at a reading sub-stage, inputting a turn-off level to the first port, inputting a working level to the second port, acquiring fingerprint information and converting the fingerprint information into a detection signal to output to the reading node by the fingerprint sensing sub-circuit, outputting, by the signal acquiring sub-circuit, a signal of the reading node to the driving sub-circuit, and outputting, by the driving sub-circuit, the signal output by the signal acquiring sub-circuit through the reading port;

the display stage comprises: at a second resetting sub-stage, inputting a working level to the first port, inputting a turn-off level to the second port, and inputting a turn-off level to the resetting port; and at a charging sub-stage, inputting a turn-off level to the first port, inputting a working level to the second port, inputting a display signal to the reading port, and outputting, by the driving sub-circuit, the display signal of the reading port to the output port.

15. A display panel, comprising the fingerprint recognition circuit according to claim 1, a plurality of gate lines, a plurality of resetting lines, a plurality of power lines, a plurality of reading lines and a plurality of display circuits, wherein each fingerprint recognition circuit is configured as following:

the output port of the fingerprint recognition circuit being connected to a display circuit;

the first port and the second port of the fingerprint recognition circuit being respectively connected to adjacent two gate lines;

the resetting port of the fingerprint recognition circuit being connected to a resetting line;

the power port of the fingerprint recognition circuit being connected to a power line;

the reading port of the fingerprint recognition circuit being connected to a reading line, which is multiplexed as a data line during a display stage.

16. The display panel of claim 15, wherein the display circuit is a pixel electrode.

* * * * *